United States Patent [19]
Steinmetz et al.

[11] 3,764,516
[45] Oct. 9, 1973

[54] ISOMERIZATION OF WAXY LUBE STREAMS AND WAXES USING ZEOLITE CATALYST

[75] Inventors: Ib Steinmetz, Wilmington; David S. Barmby, Media, both of Del.

[73] Assignee: The Furukawa Electric Company Limited, Tokyo, Japan

[22] Filed: Apr. 24, 1972

[21] Appl. No.: 246,737

Related U.S. Application Data

[63] Continuation-in-part of Ser. No. 828,746, May 28, 1969, Pat. No. 3,658,689.

[52] U.S. Cl. .......... 208/27, 208/DIG. 2, 208/18, 208/46, 208/89, 208/97, 208/111, 208/141, 260/683.85
[51] Int. Cl. .......................... C10g 35/06, C07c 5/22
[58] Field of Search ............. 208/111, 18, 20, 208/46, 89, 97, 135, 138, 141; 260/683.65

[56] References Cited
UNITED STATES PATENTS

| | | | |
|---|---|---|---|
| 3,146,279 | 8/1964 | Gallagher | 260/683.65 |
| 3,308,052 | 3/1967 | Ireland et al. | 208/27 |
| 3,400,072 | 9/1968 | Tung et al. | 208/120 |
| 3,681,279 | 8/1972 | Mills et al. | 260/33.6 |

Primary Examiner—Delbert E. Gantz
Assistant Examiner—G. E. Schmitkons
Attorney—George L. Church et al.

[57] ABSTRACT

Waxy hydrocarbons, per se or in a petroleum fraction in the lubricating oil viscosity range, can be converted to oily, non-waxy hydrocarbons by contacting the wax or wax-containing stream with an acidic aluminosilicate zeolite catalyst (e.g., CeHY, GdHX, CaHX, MgHY, NiHY, etc.) preferably in combination with a hydrogenation catalyst (e.g., Ni, Co, Mo, W, Pt, Pd, Re, Ru, etc.) at temperatures above 300°F. and at elevated hydrogen pressure (e.g., 400–6,000 p.s.i., more preferred at least 1,500 p.s.i. of hydrogen, the hydrogen purity being 50–100 percent). Preferably, the zeolite contains polyvalent metal cations, is virtually free from alkali metal cations and halide ions and is substantially anhydrous (containing about 1–10% $H_2O$ as determined by ignition analysis at 1,800°F.). Preferably, the isomerization is conducted at a temperature below the point where substantial hydrocracking will occur (e.g., below about 675°F.). More preferably, the temperature, space velocity, hydrogen pressure and gas recycle rate are so selected as to attain significant conversion of the waxy hydrocarbons to oils in the lubricating oil boiling range and with no appreciable conversion of the waxy hydrocarbons to materials boiling below the lubricating oil boiling range.

15 Claims, No Drawings

ISOMERIZATION OF WAXY LUBE STREAMS AND WAXES USING ZEOLITE CATALYST

CROSS REFERENCES TO RELATED APPLICATIONS

This application is a continuation-in-part of our application, Ser. No. 828,746, filed May 28, 1969, now U.S. Pat. No. 3,658,689, issued Apr. 25, 1972, said application (and the patents and applications referred to below) being incorporated herein by reference. Applications Ser. No. 716,190, filed Mar. 26, 1968, Ser. No. 211,040, filed Dec. 22, 1971, U.S. Pat. No. 3,624,173, issued Dec. 30, 1971 and U.S. Pat. No. 3,655,813, issued Apr. 11, 1972, all of Francis W. Kirsch, the said David S. Barmby and John D. Potts; Ser. No. 185,615, filed Oct. 1, 1971 of Alfred E. Hirschler; Ser. No. 207,870, filed Dec. 14, 1971 of John A. Hedge and U.S. Pat. No. 3,396,203, issued Aug. 6, 1968 of Ronald D. Bushick, disclose zeolite catalysts which can be used in the process of the present invention. Also useful are the catalysts of U.S. Pat. No. 3,565,964, issued Feb. 23, 1971 of Ronald D. Bushick and Alfred E. Hirschler.

BACKGROUND OF THE INVENTION

It has been known that low molecular weight paraffin hydrocarbons (such as n-heptane or n-hexadecane) can be converted to isomeric hydrocarbons by catalytic contacting at a temperature in the range of from 600° to 1,000°F. (the preferred range being 700°–900°F.) and at a pressure in the range of 100–1,000 p.s.i.g., in the presence of hydrogen (preferably, about 200 to 500 p.s.i.g., see U.S. Pat. No. 3,146,279 of Gallagher issued Aug. 25, 1964). Such isomerization (as reported in U.S. Pat. No. 3,146,279) is accompanied by a high degree of conversion to hydrocarbons of lower carbon number. For example, in U.S. Pat. No. 3,146,279, it is reported that, when contacted at 700°F., 500 p.s.i.g. and 2 WHSV in the presence of a CaNa X zeolite which also contained platinum, normal hexadecane was converted to 36.3 percent $C_{16}$ isomers and 25.2 percent of $C_{13}$–$C_{15}$ hydrocarbon.

SUMMARY OF THE INVENTION

U.S. Pat. No. 3,308,052, issued Mar. 7, 1967 to Ireland et al., deals with cracking and hydroisomerizing waxy hydrocarbons in the presence of at least 100 p.s.i. hydrogen and using as a catalyst one or more of platinum, palladium and nickel preferably on a support comprising eta alumina and especially gamma alumina or a non-alkaline base such as bentonite, bauxite, faujacite and the like containing chlorine and/or fluorine. It is well known that faujacite contains a high sodium content as an exchanged cation (typically, the cations in faujacite are Na Ca Mg) in contrast to our discovery in the present invention that in a zeolite catalyst for hydroisomerization of waxy hydrocarbons the content of sodium and other alkali metals should be as low as possible (preferably less than 25 percent of the exchange capacity of the zeolite, more preferred less than 10 percent). Generally, on a fully hydrated basis, the zeolite (such as those of application, Ser. No. 716,190) will contain less than 2 wt. percent (more preferred less than 1 percent, typically less than 0.75 percent) alkali metals and on an ignited basis less than about 3 percent (more preferred less than about 1.5 percent). Furthermore, the preferred catalysts in the present process have "protonic sites," that is, the exchanged cations include $H^+$ (or protons). Such catalysts are described, for example, in Ser. No. 716,190, 207,870 and 211,040.

U.S. Pat. No. 3,400,072 of Tung et al., issued Sept. 3, 1968, discloses lowering pour point of crudes and other hydrocarbon mixtures using zeolite catalysts which have "either been" divested of cations (decationized) or that a portion of the cation sites is occupied by polyvalent cations as opposed to monovalent cations. However, this patent does not disclose the preferred zeolites in the present process in which at least 10 percent of the exchange capacity of the zeolite is satisfied by cations of polyvalent metals (especially of the rare earth metals such as La, Ce, Gd, Dy etc.) which contain less than 1.5 percent alkali metal cations, on an 1,800°F. ignited basis and in which the remainder of the exchange capacity is satisfied by protons.

The present invention deals with the discovery that, when contacted with an acidic crystalline aluminosilicate zeolite catalyst at hydrogen pressures above 400 p.s.i. and temperatures below 675°F. and preferably below 650°F. (more preferably from 500°–575°F.), waxy hydrocarbons, such as "paraffin wax" or petroleum streams containing waxy hydrocarbons, can be converted to oily materials, without appreciable hydrocracking to materials boiling below the lubricating oil boiling range (i.e., less than 10 volume percent of the charge is converted to material boiling below 600°F.). In the preferred catalyst at least 25 percent of the exchange capacity of the zeolite is satisfied by cations of polyvalent metals and less than 25 percent (more preferred less than 10 percent) of the exchange capacity is satisfied by exchanged cations of alkali metals or amino-compounds (e.g., ammonium cations). We further prefer that the catalyst be virtually free of halide ions (e.g., less than 0.1 wt. percent on an ignited basis).

Also preferred is a zeolite which has at least 15 percent crystalline by X-ray, is capable of adsorbing benzene and having an Al/Si ratio in the range of 0.05–1.0 (more preferred 0.8–0.3, e.g., types X and Y). In view of such prior art teachings as U.S. Pat. No. 3,146,279, it is surprising that in the present process, at a temperature in the range of 500°–575°F. (typically in the range of 520°–560°F.), there can be appreciable isomerization of wax to oil with virtually no conversion of wax to hydrocarbons of lower carbon number. As used herein, the word "wax" refers to a saturated hydrocarbon or a mixture of saturated hydrocarbons having refractive indexes at 212°F. in the range of 1.41–1.45 and which melts at 80°F. or higher (generally below 210°F.). By "oil" is meant a hydrocarbon or mixture of hydrocarbons which is fluid at 50°F. and has a viscosity at 100°F. in the range of 35 SUS to 12,000 SUS.

Waxy hydrocarbons, per se or in a petroleum fraction in the lubricating oil boiling range, can be converted to oily, non-waxy hydrocarbons by contacting said wax or wax-containing stream with an acidic alumino-silicate zeolite catalyst (e.g., HX, HY, HL, LaHX, CeHY, CaHX, MgHY, BaHY, SrHL, NiHY, GdY, etc.) preferably in combination with at least one hydrogen active metal (e.g., Ni, Co, Mo, W, Pt, Pd, Re, Ru, etc.) or a hydrogen-active compound of such a metal, such as a sulfide, oxide, hydroxide and mixtures of two or more such compounds, at temperatures above 300°F. and at elevated hydrogen pressure. Preferably, the concentration of such a hydrogen-active metal is from 0.05 to 25 percent based on the weight of the zeolite. Preferably, the zeolite is substantially anhydrous (containing about 0.1–10 percent H₂O as determined by ignition analysis at 1,800°F.).

Preferably, the isomerization is conducted at a temperature below the point where substantial hydrocracking will occur (e.g., below about 675°F., more preferably below 650°F.). Preferably, the average hydrogen pressure in the catalytic contact zone is in the range of 400–6,000 p.s.i. (more preferably, at least 1,500 p.s.i. of hydrogen).

Among the preferred alumino-silicate zeolite catalysts (and catalyst combinations comprising an acidic alumino-silicate and a hydrogenation metal) are those described in U.S. Pat. No. 3,396,203 of Ronald D. Bushick, issued Aug. 6, 1968 and in the above referred to copending applications of Bushick and Hirschler and of Kirsch, Barmby and Potts. Preferably, the alumino-silicate framework of the zeolite is at least 15 percent by X-ray analysis. The zeolite is chemically characterized by the empirical formula $M(AlO_2)_x(SiO_2)_y \cdot (H_2O)_z$ where $x$, $y$ and $z$ are integers, the ratio $x/y$ being in the range of 1.0 to 0.2 (preferably 0.3–0.8) and where M signifies the cations necessary for electronic equivalency and comprises one or more of the following: $H^+$, a cation of a polyvalent metal, a metal oxide, a metal hydroxide, a metal hydride, or a metal cation containing two or more members selected from the group consisting of oxide, hydroxide and hydride. Preferably at least one such polyvalent metal cation is present for every 20 atoms of aluminum in the alumino-silicate framework of said zeolite. For most waxy hydrocarbons and wax-containing petroleum fractions boiling in the lube oil range, the ratio $x/z$ in the empirical formula of a zeolite is more preferably in the range of 0.1 to 4.

FURTHER DESCRIPTION OF THE INVENTION

Waxy lube streams or waxes can be isomerized by contacting with an acidic, alumino-silicate catalyst, in the presence of hydrogen and at a temperature below 675°F., and preferably below 650°F. (more preferably in the range of 500°–575°F.). Preferably, the conditions are such that the feed is in liquid or mixed phase. Such an isomerization process can be used to produce a lubricating oil directly from a waxy lube stream, without the conventional dewaxing procedure, or, alternatively, the process can be used in conjunction with conventional dewaxing to increase the yield of lubes.

For example, a waxy petroleum distillate in the lubricating oil viscosity range (i.e., 35–10,000 SUS at 100°F.) and which contains up to 20 wt. percent wax can be contacted with a "decationized" or "protonated" molecular sieve zeolite (e.g., HY, HX) which also contains a small amount of palladium (e.g., 0.1–2 percent), at 550°F. and at a hydrogen pressure in the range of 400–6,000 p.s.i., for sufficient time to cause appreciable lowering of the pour point of the feed. Preferably, with such distillate oil feeds, the liquid hourly space velocity is in the range of 2–10 volumes of fresh feed per volume of catalyst (based on the content of crystalline zeolite) per hour. The resulting isomerized oil stream (which can, if desired, contain some unisomerized wax) can be processed by conventional procedures, such as solvent extraction (as with furfural or phenol), conventional dewaxing (as by pressing or by crystallization as from a solvent like methyl ethyl ketone and toluene), acid contact (e.g., HF, BF₃, H₂SO₄, SO₃), clay contacting, catalytic aromatization or hydrogenation etc.

In another embodiment of the present invention, waxes (which can contain minor amounts of oil, such as from 0.1–10 percent) having solidification points (or melting points) in the range of 80°–200°F. can be converted (as at 560°F. and 1,500 p.s.i. of hydrogen) by contact with an acidic zeolite catalyst to an isomerized product having a lower solidification point (e.g., 0°–60°F.) and in which a significant proportion (typically at least 10 wt. percent) of the wax has been converted to oily materials, which are useful in lubricating oils.

In general, this conversion of waxes to oils implies the conversion of normal hydrocarbons to isomers, specifically normal hydrocarbons to branched hydrocarbons in the range of $C_{20}$ and higher. However, hydrocarbons which are not acyclic (e.g., ceroils) are present in waxes and waxy lube streams and conversion of such cyclic materials to other isomers probably also occurs in the present process in addition to isomerization of higher acyclic paraffins.

Lower molecular weight hydrocarbons (e.g., boiling in the gasoline or gas oil ranges) can also be products of the reaction, due to mild hydrocracking. However, it is an especially advantageous feature of the present process that it can be conducted under conditions such that no substantial hydrocracking occurs so as to produce appreciable material boiling below the lubricating oil range. Generally, the temperature, space velocity, hydrogen pressure and gas recycle are so chosen that no more than 10 percent (preferably less than 5 percent) by volume of the feed stock is converted, in a single pass through the reactor, to products boiling below the lubricating oil boiling range and, when the catalytic contacting is at a temperature in the range of 500°–575°F. (more preferably 520°–560°F.), the present process can be used to effect the conversion of waxes to oils with essentially no conversion of waxes to products of lower carbon number.

In our process, as in conventional hydrodesulfurization or hydrorefining, some lower boiling products (e.g., H₂S, NH₃, dry gas etc.) can be formed by hydrogenation of non-hydrocarbon impurities in the feed stocks. Any such gases or other lower boiling, low viscosity liquid products (e.g., liquids having viscosities at 100°F. of less than 35 SUS, such as gas oil or gasoline) can be removed by stripping or distillation. For example, it is generally preferred that any entrained or dissolved H₂S be removed from the oils produced by the present process. It is sometimes beneficial to pretreat the feed stocks (as by conventional hydrodesulfurization) prior to contact with the zeolite catalyst. When the zeolite catalyst contains or is in combination with a hydrogenation catalyst which can be poisoned by nitrogen or sulfur, such as platinum, it is frequently economical to pretreat the feed stock (as by contact with sulfided NiMo or NiCoMo catalyst at 450°–675°F., 300–1,500 p.s.i. of hydrogen) to reduce the sulfur and nitrogen in the feed to less than about 500 p.p.m. and more preferably to less than 50 p.p.m. (typically less than 10 p.p.m.).

In general, the present process consists of contacting the waxy hydrocarbon, or the lube stream containing the waxy hydrocarbon, with an acidic alumino-silicate zeolite catalyst at a temperature above 300°F. and at elevated hydrogen pressure. Preferably, in order to maximize the conversion of wax to oils while minimizing or effectively eliminating hydrocracking, the temperature should be below 600°F. (preferably below 575°F.), the conversion of wax to oil per pass through the reactor should be no more than about 6 percent, and the hydrogen pressure should be at least 400 p.s.i. (preferably at least 1,500 p.s.i.g. and more preferably at least 5,000 p.s.i. of hydrogen). The hydrogen can be from 50 percent to 100 percent purity (preferably at least 70 percent) and the hydrogen recycle can be in the range of 0–20,000 scf/bbl of oil. For example, at 400 p.s.i. of hydrogen the recycle is preferably in the range of 1–4,000 scf/bbl of oil, at 1500 p.s.i. the preferred range is 2,000–12,000. Liquid feed can be recycled at a product to fresh feed weight ratio below 15:1 (preferably 8:1 to 1:1). The liquid hourly space velocity of the fresh feed is preferably in the range of 0.1–10 and, more preferably, from 0.25–3.0 (based on the crystalline zeolite content of the catalyst if the zeolite is imbedded in a non-reactive carrier such as silica or alumina or, in a significantly less reactive carrier, such as an amorphous acidic alumino-silicate). When the feed is an oil, such as a distillate oil or an extract or a raffinate of a distillate oil and contains no more than about 50 wt. percent wax, the liquid hourly space velocity of the fresh feed is preferably greater than 2 (based on the crystalline zeolite content of the catalyst) at contact temperatures in the range of 550°–650°F. and is in the range of 0.5–2.0 when the contact temperature is in the range of 450°–550°F., for a distillate oil containing no more than 20 wt. percent wax (typically 9–18 percent).

In general, the waxy feeds to the present process can be of the following four general types:
 a. Wax (which can contain up to 10 percent by weight of oil),
 b. highly oily waxes (containing from 10–50 percent oil),
 c. highly waxy oils (containing from 20–50 wt. percent wax) and
 d. oil containing minor amounts (up to 20 wt. percent) of wax.

Examples of these four classes, respectively, are as follows:
 A. A paraffin distillate wax containing 1.4 percent of oil (ASTM D 721–56T), melting (ASTM D 87–57) at about 142°F., and having a viscosity at 210°F. (ASTM D 446–53) of 40.4 SUS and which is obtained from a mixed base crude.
 B. 650°–1,000°F. boiling range distillate (50 SUS at 210°F.) or deasphalted bottoms (or residua) from vacuum distillation of Rio Zulia crude, having a viscosity at 210°F. of 170 SUS and containing 60 percent wax. "Slack" waxes are also usually in this group.
 C. A straight distillate (650°–1,070°F.) of Lagomedio crude having a viscosity at 210°F. of 49 and containing 25 wt. percent wax.
 D. A raffinate oil, containing 14 wt. percent wax and boiling mainly in the range of 625°–900°F., obtained by furfural extraction (raffinate yield of 70 percent) of a paraffinic distillate of heavy B crudes.

Other examples of suitable charge stocks, which contain varied proportions of wax and oil, are those listed in U.S. Pat. No. 3,308,052 of Henry R. Ireland and Michael T. Smilski issued Mar. 7, 1967.

Process conditions which maximize yield of oil and minimize the production of lower boiling products can vary greatly from class to class even though the type of wax and type of oil are similar. In general, where the wax content is high (50–100 percent), the primary considerations are to utilize a temperature in the range of 450°–600°F. (more preferably no greater than 550°F.) and a sufficiently low space velocity to provide for a reasonable degree of conversion of wax to oil. In any event, the conditions should be so selected that less than 15 percent of the charge is converted, per pass, to products boiling below 650°F. In contrast, where the wax content is less than 50 wt. percent, temperatures above 550°F. to as high as 675°F. can be utilized (but preferably, the temperature with such feeds is no greater than 650°F.); however, to minimize or effectively eliminate hydrocracking to material backing below the lube range, a high liquid hourly space velocity (2 or more) is beneficial. Where the wax content is less than about 20 percent and the contact temperature is no greater than 550°F., a liquid hourly space velocity in the range of 0.5 to 5 is beneficial.

Preferably, in a commercial fixed-bed reactor, the catalyst bed comprises at least 10 percent, and can contain up to 100 percent, of acidic crystalline alumino-silicate zeolite catalyst, the remainder being comprised of amorphous alumino-silicate, alumina, silica, acidic clays, bauxite, and a hydrogenation catalyst. In a stirred slurry reactor, it is preferred that the catalyst be as close to 100 percent crystalline as economics will permit since, in general, the catalyst with the higher degree of crystallinity will have the greater activity and, therefore, can be used at lower catalyst to feed ratios (and, thus, will require less power (or agitation) to remain in suspension).

The catalyst can be any of the acidic crystalline alumino-silicate zeolites disclosed in the aforementioned applications or in the U.S. Pat. No. 3,396,203 to Bushick. Among the preferred catalysts is an acidic alumino-silicate zeolite which can adsorb benzene, is at least 15 percent crystalline, contains polyvalent metal cations, by X-ray, and which also has associated therewith a platinum group dehydrogenation catalyst (which can be incorporated with the zeolite by exchange, impregnation or physical blending). Other operative catalysts include an acidic zeolite catalyst and a dual-function (hydrogenation and isomerizing) catalyst like CoMo, NiW, NiCoMo, CoW, etc. or a promoted catalyst, as for example, by addition of a fluoride or a chloride to a hydrogenation catalyst such as Pt, Pd, Ni, etc.

Preferably, prior to contacting the feed with the catalyst, the alumino-silicate zeolite is activated (as, for example, by the procedures described in the Kirsch, Barmby, Potts application, Ser. No. 716,190 and in South African Pat. No. 4803/67 which issued May 29, 1968) until it is substantially anhydrous (including forms known to the art as "dehydroxylated" and "ultrastable," see J. Catalysis 13, 114–116 (1969)) and, when a hydrogenation catalyst is also present, (such as palladium) the catalyst combination is preferably reduced with hydrogen prior to introduction of the feed (such as by passing hydrogen at atmospheric pressure and at 1,000°F. over the catalyst for about 2 hours). Among the commercially available catalysts which can be used in the present process (either per se or in combination, as by admixture, with other catalysts) are those marketed under the trade names Linde SK–100, SK-110, SK-200, SK-300, SK-400, SK-410 and SK-500.

When the charge stock to the present process is a wax-containing, petroleum fraction in the lubricating oil range (having a viscosity in the range of 35 SUS-10,000 SUS at 100°F.), the conversion of waxes in the feed to hydrocarbon products of lower carbon number, during the isomerization, can be virtually undetectable (by vapor phase chromatographic analysis) when the contact temperature is no greater than 575°F. At temperatures below 600°F., with the proper choice of conditions (especially pressure and space velocity), the production of lower carbon number hydrocarbon products can be kept below 5 percent by weight, based on the fresh feed.

With commercially available zeolite catalysts, the conversion per pass under these conditions will be less than 60 volume percent (typically from 10–30 percent) based on the volume of fresh feed; however, higher degrees of conversion with substantially no hydrocracking to gaseous products can be obtained with crystalline alumino-silicate zeolite catalysts which contain less than one alkali metal cation and at least one cationic monovalent, divalent or trivalent rare earth metal (e.g., $Dy^{+3}$), metal oxide (e.g., $^+DyO$ or $^{+2}Gd$-$O$-$Gd^{+2}$) metal hydride (e.g., $HGd^{+2}$) metal hydroxide (e.g., $^{+2}CeOH$) or mixed metal hydride hydroxide (e.g., $H$—$La^+$—$OH$) for every 12 atoms of aluminum in said alumino-silicate framework. Preferably, the content of alkali metal cations is as low as as economics will permit, typically, less than 0.5 weight percent (more preferably less than 0.1 weight percent) of alkali metal. The catalyst can also be promoted with a compound of fluorine or chlorine (e.g., such as HF, $BF_3$, $CCl_4$, $BCl_3$, $AlCl_3$, $CH_3Cl$, chlorinated paraffins, etc.). Minor amounts of water (e.g., steam) can also have a promoting effect, as by addition to the reactor with the fresh feed or by exposing the activated catalyst to moist air or steam (at temperatures up to about 450°C.) prior to incorporation in the reactor.

When the hydrogenation catalyst is a sulfactive metal such as W, Ni, Mo, Co or a combination of two or more such catalysts (NiCoMo or NiW, etc.) it is sometimes advantageous to precondition the catalyst by sulfiding, as by exposure to $CS_2$ or to $H_2S$). The petroleum distillate which contains waxy hydrocarbons can also be extracted with an aromatic-selective solvent (e.g., furfural, phenol, etc.) prior to contact with the catalyst in order to reduce the aromatic content of the feed and provide for a greater degree of conversion of waxy materials to desired products.

In contrast with the prior art disclosures that the zeolite-catalyzed hydroisomerization of n-paraffins is accompanied by a concommitant decrease in the carbon number of a considerable proportion of the feed paraffin (and even a significant production of gaseous hydrocarbons), in the process of the present invention it has been discovered that at a temperature of about 575°F., or lower, (typically 520°–560°F.) waxy hydrocarbons can be isomerized to oils without any appreciable conversion of the waxy hydrocarbon to materials of lower carbon number. Except for a small production of methane, ethane, propane, butanes, pentanes and/or such gases as $H_2S$, $NH_3$, $H_2O$ or HCl which are produced by hydrodesulfurization of heterocyclic oxygen, sulfur and nitrogen compounds or other non-hydrocarbons which can be present as impurities in lubricating oil distillates, the present process can be used to isomerize waxy hydrocarbons in a hydrocarbon feed in the lubricating oil viscosity range while producing virtually no lower carbon number materials.

For example, where the waxy hydrocarbons are contained in an oily feed stock (such as a distillate, extract or raffinate) which contains less than 50 wt. percent of wax, the present process is capable of effecting significant conversion of the waxy hydrocarbons to oil with a surprisingly small concommitant conversion of the feed to hydrocarbons boiling in the $C_1$–$C_5$ range (e.g., less than 75 scf of such gases — typically, less than 35 scf and even less than 15 scf — are produced, in a single pass through the reactor, for each barrel of fresh feed stock).

In general, a $C_1$–$C_5$ gas production in the range of 10–30 scf/bbl of feed per pass is typical in the hydrotreating or hydrorefining of lube oil boiling range feeds as distinguished from hydrocracking where 100 and more scf/bbl is typical. In lube oil distillate, an average molecular weight is about 400–600. Therefore, if 100 percent of such a lube oil charge was converted to $C_1$–$C_5$ gases about 5,000 scf of gases would be produced per barrel of feed. Therefore, it can be seen that such gas production in the present process can be limited to no more than about 2 percent (typically less than 1 wt. percent) of the feed (per pass through the reactor). Chromatographic analysis of a waxy hydrocarbon feed material (such as a paraffinic raffinate produced by furfural extraction of a lubricating oil distillate fraction obtained from crude oil having a viscosity-gravity constant within the paraffinic crude range) before and after catalytic contact in the present process will indicate no significant conversion to lower carbon number products (e.g., less than 10 percent by volume based on the weight of feed converted, and typically less than 1 percent) in a preferred embodiment.

In general, the waxy hydrocarbons which can be converted to oils by the present process contain at least 20 carbon atoms. Hydrocarbon feeds obtained from petroleum distillates, and which are useful in the present process, can contain waxy hydrocarbons having as many as 60 carbon atoms (more preferably, the waxy hydrocarbons to be converted contain in the range of 22–44 carbon atoms).

A particularly useful feed stock for the present hydroisomerization process is a distillate fraction in the lubricating oil boiling range, obtained by distillation of Lagomedio, Louisiana Heavy B, Rio Zulia or similar waxy crudes. Such distillate products, or the extract or raffinate from extraction of such a distillate with an aromatic selective solvent, will frequently leave a waxy film on the sides of a container (such as a glass bottle) containing a sample thereof. The present hydroisomerization process can be used to reduce or eliminate this waxy deposit from such distillates, extracts or raffinates.

Among the uses which can be made of the process of the present invention are the following:

1. Converting waxes (including "slack waxes") to lower boiling hydrocarbons of substantially the same carbon number as the wax;
2. Converting waxy lube streams, either entirely or in part, to low pour point lubes;
3. Isomerizing naphthenic lubes to lower the viscosity pour, increase the viscosity index and improve such other properties as ultraviolet stability, oxidation stability, thermal stability and such electrical properties as dissipation factor (in the case of cable oils) and the impulse-breakdown voltage (for transformer oils); and 4. When conducted under conditions such that substantially all of the aromatic hydrocarbons present in the oil are saturated (or when the isomerized product is subjected to an additional hydrogenation step to saturate residual aromatics) the resulting product can be useful as a lubricant in a traction drive transmission (or as a component of such a lubricant). For use in a traction drive transmission, as a lubricant, the product oil should contain less than 1 percent of aromatic hydrocarbons, and preferably less than 0.1 percent.

The process can also be useful for upgrading aromatic extracts, such as rubber oils, particularly when the isomerized product is subjected to an additional processing step in which aromatization of naphthenic hydrocarbons to aromatic compounds occurs (see U.S. Pat. No. 3,681,279 from application Ser. No. 636,493, filed May 5, 1967, of Ivor W. Mills, Glenn R. Dimeler, Merritt C. Kirk, Jr. entitled "Process for Preparing an Aromatic Oil and Non-Discoloring Rubber Compound Containing Said Oil").

ILLUSTRATIVE EXAMPLES

In the following illustrative examples, Examples 1–8 illustrate the results which can be obtained in a rocking autoclave when waxes (or lubricating oil distillates containing waxy materials) are contacted with an acidic alumino-silicate zeolite catalyst (in the Examples, protonated type Y zeolite (HY) containing about 0.5% Pd) at temperatures in the range of about 300° to about 750°F. at hydrogen pressures in the range of about 400–6,000 p.s.i. (with hydrogen of from 50–100 percent purity). Examples I and IV show that at temperatures above 600°F., considerable hydrocracking can occur. Examples II and III illustrate that little or no isomerization to oily products occurs at temperatures in the range of about 300°–350°F. with the HY (Pd) catalyst. Examples V and VI show that significant conversion of wax to oil can occur at temperatures in the range of 500°–550°F. with no appreciable hydrocracking of the feed wax. Examples VII and VIII illustrate the results that can be obtained from the present process when a hydrocarbon charge in the lubricating oil boiling range and containing waxy hydrocarbons is contacted with an acidic zeolite catalyst at temperatures in the range of 550°–650°F. and hydrogen pressures in the range of 1,500 p.s.i. (and higher) at relatively low catalyst-feed ratios.

Examples IX and X illustrate the practice of the present process in a continuous manner wherein, in Example IX, the charge stock is a raffinate oil obtained by furfural extraction of a paraffinic distillate in the lubricating oil boiling range and, in Example X, when the aromatic extract product from the furfural extraction is the charge stock to the continuous isomerization process.

EXAMPLE I

A rocking autoclave having a volume of 300 cc. was charged with 62.8 grams of a paraffin wax which is available commercially under the trade designation Sunoco 3425 and which has the physical properties shown in Table 1. Also charged with the wax was 10.4 grams of HY (Pd) zeolite catalyst (available commercially as Linde SK–100), which had been pulverized so that 100 percent of the catalyst would pass through a 100 mesh screen. Table 2 presents an analysis of the HY (Pd) zeolite. Prior to introduction of the catalyst to the bomb, the commercially available catalyst was activated in a pyrex tube as follows:

The catalyst was heated to 300°F. in a stream of flowing nitrogen. Then the nitrogen stream was replaced by a stream of flowing hydrogen (20 scf $H_2$ per pound of catalyst) and the temperature slowly increased to 380°F., at which temperature there was a sudden drop in temperature and a considerable quantity of water was observed at the outlet of the tube. The hydrogen flow and heating was continued until the temperature in the tube was 1,000°F. While the catalyst temperature rose from 380 to the final temperature of 1,000°F., there were a number of times when the temperature dropped and water formed at the outlet of the tube. The catalyst was maintained at 1,000°F. in the presence of flowing hydrogen for 2 hours and then allowed to cool under a nitrogen purge. The cooled catalyst was then charged to the autoclave.

The autoclave was pressurized at ambient temperature (34°C.) to 1,500 p.s.i. with hydrogen and then heated to 730°F. over a period of about 4 hours. No hydrogen was consumed until the temperature reached 180°F. The bomb was continually repressurized to about 5,000 p.s.i.g. with hydrogen over that period. The time at a temperature over 600°F. was less than 1 hour, with the average temperature during the run being about 500°F. The peak temperature was about 730°F., for 10 minutes, at a pressure (at that temperature) of abou 5,000 p.s.i.g. After reaching 730°F., the bomb was allowed to cool to room temperature at which time the pressure was 1,600 p.s.i.

Table III herein summarizes the conditions of this example and describes the product obtained, which was a liquid which contained oil boiling in the lubricating oil boiling range. Vapor phase chromatographic analysis indicated about 50 percent of the wax charge was hydrocracked to hydrocarbons lighter than gas oil. The waxy lube yield was about 50 percent of the charge and the wax-free lube yield was about 33 percent of the charge.

EXAMPLE II

Example I was repeated except that the conditions were those summarized in Table 3 under the heading "Run 2" and included a peak temperature of 315°F. Table 2 describes the results of this run, which did not produce any appreciable amount of oil from the wax charge. However, the aromaticity, by ultraviolet analysis (UV aromaticity) was reduced from 0.6 in the charge to 0.00 in the product of Run 2. This indicates that wax feeds can be hydrogenated with a platinum group metal catalyst at temperatures around 315°F. (e.g., 300°–350°F.) and hydrogen pressures in the range of 300–5,000 p.s.i.g. to completely eliminate UV aromaticity in the wax while producing no isomerization or cracking of the wax. Such hydrogenation also improves the color of the wax (especially of residual waxes which have not been clay contacted). For those uses which require that the wax meet specifications of the United States Food and Drug Administration, it can be highly desirable to so reduce the UV aromaticity of the wax. When the feed to the present process is wax, a reduction of UV aromaticity is one advantage of the present invention. When this run is repeated at longer contact times with a GdHY (Pt) catalyst and at appreciably higher catalyst to feed ratios (from 0.5–2 parts by weight of catalyst per part by weight of wax), some wax can be converted to oil with no appreciable hydrocracking.

EXAMPLE III

Example I was repeated except that the conditions are those summarized in Table 3 under the heading "Run 3" and included a peak temperature of 450°F. and 12 hours of catalyst/feed contact at the peak temperature. The product had an oily appearance, indicating that some isomerization of wax to oil had occurred. A higher catalyst/feed ratio (e.g., in the range of of 0.5 to 2 grams of catalyst/gram of hydrocarbon) can be used to increase the degree of conversion of wax to oil.

The degree of conversion of wax to oil at 450°F. can also be increased by utilizing catalysts prepared by rare earth exchange of an ammonium-exchanged zeolite (which is as free from alkali metal ions as economics will permit), followed by activation to remove substantially all of the ammonia and water in the zeolite. Similarly, such a catalyst when compounded with about 0.5 percent of a noble metal catalyst and activated with hydrogen, under the procedure of Example I, can appreciably increase the degree of conversion of wax to oil, particularly at temperatures in the range of 500°–550°F.

EXAMPLE IV

Example III was repeated except that the conditions were those shown in Table 3 as "Run 4" and included a temperature of 600°F. and a lower catalyst/feed ratio. A liquid product was obtained from this run which did not appear to contain any compounds of about the same carbon number as the compounds in the wax charge, but appeared (by gas chromatographic analysis) to be completely hydrocracked to hydrocarbons containing 20 or less carbon atoms. The product also had a surprisingly low pour point, indicating that temperatures around 600°F. (e.g., 575°–650°F.) and long contact time (or low space velocity) with a combination catalyst comprising an acidic zeolite catalyst and a hydrogenation catalyst, can be useful in producing low pour point fuels (and/or light lubes, white oils or textile oils) from waxes or wax-containing petroleum feeds.

At 600°F., with HY (Pd) or a catalyst of this activity level (or greater) very low contact times (less than 2 hours under the conditions of Run 3) or high liquid hourly space velocity (2–10), for continuous processing, are required if the production of oil is to be maximized and hydrocracking to products boiling below 600°F. is to be effectively eliminated. More preferred is to maintain the contact temperature at no greater than 560°F.

EXAMPLE V

Example I was repeated except that the conditions were those shown in Table 3 as "Run 5" and included a larger bomb (1,000 cc.) and a temperature of 500°F. As is summarized in Table 3, a solid product was obtained, which had an oily appearance and which, upon analysis, indicated a yield of at least 5.8 percent of oil. The product also had a solidification point of 45°F. which was a considerable reduction from the initial 125°F. solidification point of the wax. The yields indicated in Table 3 are minimum yields, since after extraction of the oil the wax appeared to contain appreciable quantities of unextracted oil. Appreciable increases in the yield of oil can be obtained by utilizing a more active zeolite catalyst, or higher catalyst/feed ratios (or, in a continuous process, a lower LHSV, such as 0.1–0.5).

EXAMPLE VI

Example V was repeated except that the conditions were those shown in Table 3 as "Run 6," and, within experimental error, involved only a change in the peak reaction temperature. That is, the temperature in "Run 6" was 550°F. instead of the 500°F. of "Run 5." A minimum yield of 16 percent of oil was extracted (at −12°F.) from the product of "Run 6", which was a solid with an oily appearance and having a solidification point of 35°F. No detectable conversion of wax to lower carbon number compounds was observed by vapor phase chromatographic analysis of the product of "Run 6."

At 550°F. and hydrogen pressures above 1,500 p.s.i.g. (preferably above 3,000 p.s.i.g.), a significant increase in the yield of oily product, over that observed in this example, can be obtained by utilizing higher catalyst/feed ratios (e.g., 0.1–1.0), a more active catalyst, such as CeHY (Pd), or, in a continuous process, a liquid hourly space velocity in the range of 0.1–2.0. A recycle of unreacted product can be used at temperatures in the range of 520°–560°F. and pressures above 1,500 p.s.i. of hydrogen to substantially completely convert wax or waxy hydrocarbons to oils in the lubricating oil boiling range with no significant production of gaseous hydrocarbons (other than those which can be attributed to removal of heterocyclic, sulfur, nitrogen and oxygen compounds and other non-hydrocarbon impurities present in the feed materials).

EXAMPLE VII

Example VI was repeated except that the conditions were those shown in column 7 of Table 3, and included substituting a raffinate oil, in the lubricating oil boiling range, for the wax of Example VI. Vapor phase chromatographic analysis of the product indicated appreciable conversion of waxy hydrocarbons present in the raffinate oil to materials in the lubricating oil boiling range and some conversion of the feed materials to hydrocarbons of lower molecular weight. At 550°F., conversion of wax to lower molecular weight hydrocarbons can be effectively eliminated by reducing the catalyst-/feed contact time (or, in continuous runs, using a liquid hourly space velocity of about 2).

EXAMPLE VIII

Example VII was repeated except that the conditions were those summarized in column 8 of Table 3 and included a temperature of 650°F. A liquid product was obtained, which contained oil of about the same carbon number as the compounds in the molecular weight range of the original charge and no significant amount of wax, but which also contained an appreciable quantity of hydrocracked product lighter than gas oil (as indicated by chromatographic anaylsis). The liquid product of this example contained no significant amount of wax and had a specific gravity which was about 18 percent less than that of the feed. Such a large decrease in specific gravity of a lube boiling range petroleum distillate indicates that the type of conversion in the present example can be of great economic value, to a refiner, since it can give him a great increase in volume yield. Conditions which favor such high volume yield conversions, from waxy distillates containing up to 50 percent wax, are a temperature in the range of 630°–680°F., a hydrogen pressure of 750 p.s.i. — 7,500 p.s.i. a catalyst combination of an acidic zeolite of the faujasite class and a hydrogenation catalyst, and a long contact time (or low space velocity, e.g., less than 0.5).

EXAMPLE IX

A raffinate oil charge stock, having the same properties as the charge used in Examples VII and VIII, was contacted in a continuous, pilot plant scale, fixed-bed reactor containing a bed of pelleted (3/16 inch × 3/16 inch) SK–100 catalyst (which was activated with hydrogen, in the reactor, in a similar manner to that shown in Example I). The "gas" flow through a low pressure stripper or separator, at about 100°F. and 15 p.s.i.g., (separated in Table 4 under the heading "LP Gas Yield") was observed at various operating conditions (as summarized in Table 4 herein as Runs 421–426). The LP gas yield is an indicator of the degree of hydrocracking. Typically, in this particular pilot plant operation such low pressure gas analyzed at least 50 percent hydrogen (Run 426 analyzed 54.4% $H_2$) with the remainder being $C_1$–$C_5$ hydrocarbons and a small proportion (less than 2 percent) being $H_2S$. Therefore, the "LP Gas Yield," as observed in these runs, indicated the maximum degree of conversion of the feed to $C_1$–$C_5$ hydrocarbons and, thus, indicated whether, at a particular set of process conditions, there was any appreciable conversion of the feed to materials boiling in the $C_1$–$C_5$ range. In general, an LP gas yield of less than 100 scf/bbl of feed indicates the absence of appreciable hydrocracking. Therefore, it can be seen from the summary in Table 4, that no appreciable hydrocracking occurred in Runs 422–425. Vapor phase chromatography of the product of Run 421 indicated that the feed had been heavily hydrocracked to hydrocarbons below the lube oil boiling range. In contrast, vapor phase chromatography of the product of a run similar to Run 421, but at an LHSV of 2 and a gas recycle of 2,500 scf/bbl, indicated that, although some hydrocracking occurred, the product was primarily in the lube oil boiling range. Vapor phase chromatographic analysis of the products of Runs 422 and 423 (both at 550°F.) showed that no appreciable hydrocracking had occurred (to products boiling below the lube oil range) and that there had been a significant conversion of wax to oil.

EXAMPLE X

The present process is also useful for upgrading extracts from paraffinic distillates. The process can be used to isomerize residual quantities of wax (from 0.5–5 percent) which can be objectionable in such distillates for some uses, such as for a vinyl plasticizer. Although, for other uses such small quantities of wax are desirable, such as in rubber compositions which are to be extruded, since the wax helps increase the extrusion rate. The present hydroisomerization process is also useful in upgrading such extracts by increasing the viscosity-gravity constant of the extract, probably by conversion of low viscosity compounds to compounds of higher viscosity. Runs 427–433 of Table 4, herein, summarize the conditions used in a continuous isomerization, on a pilot plant scale, of a 30 percent extract (by furfural) of a paraffinic distillate obtained from Texas and Louisiana crudes. The raffinate from this extraction was the feed in Example IX. Another desirable extract charge for this process is an extract obtained from a distillate of a highly waxy crude, such as Lagomedio, since such extracts contain sufficient wax to cause formation of a waxy film on glass vessels from which samples of such oil are poured. Such a waxy appearance on the walls of a glass vessel can be objectionable to customers who are not aware of the origin of this film.

The present process can also be used to isomerize high melting hydrocarbons present in distillate naphthenic or aromatic crudes in orer to upgrade such properties as pour point (or cloud point), viscosity index etc. of these distillates (or in extracts or raffinates from such distillates).

The preferred lube oil viscosity range feedstocks to the present process are fractions of crudes classified as paraffinic or "mildly naphthenic" by the viscosity-gravity constant (VGC) classification system; that is, the VGC of such a fraction will be in the range of 0.790–0.849. The feed fractions can have been subjected to such additional refining as solvent extraction (e.g., either the raffinate or the extract) can be used in the present process.

In the present application abbreviations of the type "CaNaHY" have been used to indicate alumino-silicate zeolites containing the indicated exchanged cations (i.e., calcium, sodium and "protons") and the "Linde" type of zeolite structure (i.e., Y indicates Linde type Y (as described in U.S. Pat. No. 3,130,007), X is Linde type X, etc. A more precise notation is to indicate the percent of exchange capacity which is satisfied by each cation. For example, 3 Na 28H 69CeY indicates that 3 percent of the exchange capacity is satisfied by cations of sodium, 69 percent by cations of cerium and by difference, the remainder is hydrogen or protons.

In the preferred alumino-silicate zeolite catalysts, at least 10 percent and, preferably, at least 40 percent (typically, 50–80 percent) of the electronegativity associated with the alumino-silicate framework is satisfied by cations of polyvalent metals or of oxides or hydroxides of such metals. Further preferred is that the zeolite catalyst contains less than one alkali metal cation (e.g., $Na^+$) for every 4 aluminum atoms in the alumino-silicate framework (more preferred, less than one such cation for every 10 such Al atoms). Preferably, the alumino-silicate zeolite is at least 15 percent crystalline (by X-ray analysis) and is chemically characterized by the emprirical formula $M_x(AlO_2)_x \cdot (SiO_2)_y(H_2O)_z$, where $x$, $y$ and $z$ are integers, the ratio $x/y$ being from 1.0 to 0.05 and where M is chosen from one of the following groups: (or a combination of equivalent valence of members of two or more said groups).

1. a tetravalent, trivalent or divalent metal, metal oxide or metal hydroxide when the atomic ratio Al/Si of said alumino-silicate is greater than 0.65, there being at least one said cation for every 16 atoms of Al in the alumino-silicate tetrahedra (or framework) of said zeolite;
2. trivalent or divalent metal, metal oxide or metal hydroxide when the atomic ratio Al/Si of said alumino-silicate is from 0.65 to 0.35, there being at least one said cation for every 12 atoms of aluminum in said framework; and 3. divalent metal, metal oxide or metal hydroxide, when the atomic ratio Al/Si of said alumino-silicate is less than 0.35, there being at least one said cation for every 8 atoms of aluminum in said framework. and wherein the balance of the cations necessary for electronic equivalency comprises $H^+$ or cations of metals, metal oxides, or metal hydroxides and wherein there is less than one alkali metal cation for every four atoms of aluminum in the alumino-silicate zeolite, more preferably, less than one alkali metal cation for every ten atoms of aluminum. This latter requirement can be also considered as requiring that less than 25 percent (more preferred less than 10 percent) of the exchange capacity of the zeolite is satisfied by cations of an alkali metal.

The preparation of such zeolites (which contain such polyvalent cations) is well kown. A typical procedure comprises aqueous exchange of a sodium form of the zeolite (e.g., Linde Type Y) with polyvalent metal ions (as with an aqueous cerium nitrate). More preferred is to first exchange a sodium faujasite with aqueous ammonium ions until the resulting ammonium-zeolite contains less than one cation of sodium for every four atoms of aluminum in the framework (more preferred less than one sodium cation for every 10 or 20 atoms of aluminum). The resulting ammonium-zeolite can then be exchanged with polyvalent cations to produce the desired zeolite. Upon activation, as by heating in air, water is removed and any residual ammonium ions decompose to form "protonic" or "cation deficient" sites. The symbol $CeNH_4Y$ is sometimes used to denote a predominantly cerium ammonium-Y zeolite of low sodium content (of the preferred class referred to herein) and, after activation, the resulting cation deficient zeolite can be denoted as "CeHY" or less precisely, "CeY." However, it should be noted that, depending upon activation conditions, the cerium can be present in a number of cationic forms, e.g., $HOCe^{+2}$ or $Ce^{+3}$ etc., and the hydrogen in the zeolite may be protonic or hydroxyl. Whether in one or a combination of such forms, any polyvalent metal containing zeolite of the type described herein can be useful in the process of this invention.

In general, the ratio $x/z$ in the empirical formula of a zeolite is preferably in the range of 0.25 to 6. If excess water is present (over that desired for a given reaction), the zeolite can be activated by heating according to the procedure disclosed in the aforementioned applications of Kirsch, Barmby and Potts. If the zeolite is deficient in "bound" water, such water can be added, as by exposure to steam in air or nitrogen.

Operative polyvalent cation-containing zeolites can be those taught in application, Ser. No. 716,190 of Kirsch, et al. As used herein, the term "framework," in reference to the alumino-silicate portion of the zeolite (which can be crystalline or amorphous), excludes those aluminum ions which are in exchange positions and which are neutralizing some of the negative charge associated with the aluminum atoms in the alumino-silicate tetra-hedra of the zeolite. Note that aluminum in the alumino-silicate framework can be either trigonal or tetrahedral.

If, at a given reaction temperature, the catalyst activity appreciably decreases during the course of the reaction, it is sometimes advantageous to add water (e.g., steam) with the feed. An increase in reaction temperature can often be used to prolong effective catalyst life. Alternatively, the catalyst can be separated from the hydrocarbon reactants and regenerated, as by burning in air, or mixtures of air and inert gas such as nitrogen. After such burning, water can be added to the catalyst, as by exposure to hydrogen or to steam in air or nitrogen.

The following table shows the composition in terms of percent of exchange capacity of a number of $cerium^{+3}$ and/or ammonium exchanged Y zeolites (from Ser. No. 716,190) and the composition after activation to decompose the ammonium cations.

| Zeolite As Is | Catalyst After Activation |
|---|---|
| 18Na 82NH₄ | 18Na 82H |
| 11Na 89NH₄ | 11Na 89H |
| 3Na 97NH₄ | 3Na 97H |
| 9Na 15NH₄ 7H 68Ce | 9Na 23H 68Ce |
| 3Na 18NH₄ 10H 69Ce | 3Na 28H 69Ce |
| 3Na 48NH₄ 49Ce | 3Na 48H 49Ce |
| 17Na 19NH₄ 64Ce | 17Na 19H 64Ce |

All of these catalysts can be considered as decationized zeolites containing exchanged polyvalent metal cations and can be used in the present process, especially if a platinum group metal is also included, as by exchange or impregnation.

Another means of expressing a preferred class of such zeolites compositions is shown in Ser. No. 211,040 and is a formula of the form $M_x(AlO_2)_x(SiO_2)_y(H_2O)_z$ where f(Na): g(H):h(RE)=$M_x$; where $x$, $y$ and $z$ are integers, RE is at least one cation of a rare earth metal, the ratio $x/y$ is in the range of 0.2 to 1.0, $z$ is in the range of $0-2x$ and $f$, $g$ and $h$ are the percentage cation distributions of Na, H and RE, and wherein f is in the range of about 0 to 20, g is in the range of about 10 to 50 and h is in the range of about 45–70, and the sum of $f$, $g$ and $h$ is about 100.

Another preferred zeolite, which can be activated by heating to make a preferred CeHY catalyst, is expressed as being about $0.1Na_2O:A_2[(NH_4)_2O]:A_3(H_2O):0.7(Ce_{2/3}O):Al_2O_3: 4.7SiO_2$, where the sum of $A_2$ and $A_3$ is about 0.2.

TABLE 1

Properties of Sunoco 3425 Wax

| Property | Test Method | Result |
|---|---|---|
| Melting Point, °F. | AMP | 130 |
| Melting Point, °F. | ASTM D-87-57 | 127 |
| Oil Content | ASTM D-721-56T | 0.4 |
| Color, Saybolt | ASTM D-156-53T | +26 |
| Viscosity, SUS (at 210°F.) | ASTM D-446-53 | 38.8 |
| Viscosity, Cs. (at 210°F.) | ASTM D-445-53T | 3.8 |
| Flash (open cup) °F. | ASTM D-92-57 | 420 |
| Specific Gravity at 60°F. | | 0.906 |
| at 212°F. | ASTM D-287-55 | 0.760 |

TABLE 2

Catalyst Data SK-100

| Type | Decationized Type Y Molecular Sieve |
|---|---|
| SiO₂ Wt. % Dry Basis | 74 |
| Al₂O₃ Wt. % Dry Basis | 25 |
| Na₂O Wt. % Dry Basis | 1.5 |
| Cl⁻ Wt. % Dry Basis | <0.05 |
| F⁻ Wt. % Dry Basis | <0.05 |
| Pd Wt. % Dry Basis | 0.5 |
| Surface Area | >500 M²/g |
| Bulk Density | 0.70 g/cc |

TABLE 3

[Batch hydroisomerization with Pd-loaded, hydrogen faujasite catalyst—run summary]

| Run number | Charge | 1 | 2 | 3 | 4 | 5 | 6 | Charge | 7 | 8 |
|---|---|---|---|---|---|---|---|---|---|---|
| Charge | 3,425 | 3,425 | 3,425 | Wax | Wax | Wax | Wax | Raffinate oil [2] | 1,000 | 1,000 |
| Bomb vol. cc | | 300 | 300 | 300 | 300 | 1,000 | 1,000 | | 1,000 | 1,000 |
| Peak temp., °F | | 730 | 315 | 450 | 600 | 500 | 550 | | 550 | 650 |
| Initial pressure, p.s.i.g | | 1,500 | 3,000 | 2,000 | 1,500 | 1,500 | 1,500 | | 1,500 | 1,500 |
| Peak pressure, p.s.i.g | | 5,000 | 5,000 | 3,450 | 2,850 | 3,450 | 2,700 | | [3] 2,600 | [3] 2,550 |
| Run time, hrs.[1] | | 6.0 | 3.5 | 19.5 | 19.0 | 19.0 | 18.5 | | 19.0 | 19.5 |
| Time at peak temp., hrs | | 0.2 | 0.5 | 12.0 | 12.0 | 12.0 | 12.0 | | 12.0 | 12.0 |
| Catalyst, gms | | 10.4 | 10.0 | 10.0 | 2.5 | 5.0 | 5.0 | | 5.0 | 5.0 |
| Charge, gms | | 62.8 | 41.0 | 41.0 | 41.0 | 82.0 | 82.0 | | 85.0 | 84.9 |
| Oil product: | Wax | | | | | | | Raff. | | |
| Yield, wt. percent | | | | | 3.5 | 5.8 | 16.0 | | | |
| Solid point, °F | +125 | | | | | +45 | +35 | +80 | | |
| Viscosity, 210° F., K.V | 3.8 | 1.1 | 3.8 | | 3.9 | | 3.8 | 3.9 | 1.1 | |
| Viscosity, 100° F., K.V | | | | | 19.2 | | | 19.2 | | |
| UV aromaticity (wt. percent) | 0.6 | 0.03 | 0.00 | 0.03 | 0.03 | 0.03 | 0.04 | | | |
| Pour point | +125 | 50 | 125 | | −65 | 40 | 30 | | | |
| Refractive index (20° C.) | | 1.414 | | | 1,416 | | | | | |
| Specific gravity | 0.81 | 0.73 | | | 0.74 | | 0.78 | 0.83 | 0.79 | 0.68 |
| Percent decrease in specific gravity | | 9.9 | | | 8.7 | | 3.7 | | 4.8 | 18.1 |

[1] Including heating and cooling.
[2] Contained 12% wax and was obtained by solvent extraction of a paraffinic distillate. Raffinate yield was 79% of charge to extractor.
[3] In Runs 7 and 8 there was a pressure drop of 300 p.s.i.g. indicating appreciable hydrogen consumption.

TABLE 4

[Production of low pressure separator gases from continuous pilot plant contact of waxy lube stocks with hydrogen and Pd-loaded, acidic zeolite]

| Run No. | Feed stock | Temp., °F. | Pressure, p.s.i.g. | LHSV | Gas recycle, s.c.f./bbl. feed | LP gas yield,[1] s.c.f./bbl. of feed |
|---|---|---|---|---|---|---|
| 421 | Raffinate | 650 | 500 | 0.5 | None | 470 |
| 422 | do | 550 | 500 | 2.0 | None | 33 |
| 423 | do | 550 | 500 | 0.5 | 2,500 | 75 |
| 424 | do | 450 | 500 | 2.0 | 2,500 | 24 |
| 425 | do | 450 | 500 | 0.5 | None | 27 |
| 426 | do | 650 | 500 | 2.0 | 2,500 | 240 |
| 427 | Extract | 450 | 500 | 2.0 | 2,500 | 24 |
| 428 | do | 450 | 500 | 0.5 | None | |
| 429 | do | 550 | 500 | 2.0 | None | 69 |
| 430 | do | 550 | 500 | 0.5 | 2,500 | 89 |
| 431 | do | 650 | 500 | 2.0 | 2,500 | 120 |
| 432 | do | 650 | 500 | 0.5 | None | 110 |
| 433 | do | 450 | 500 | 2.0 | 2,500 | 14 |

[1] Includes hydrogen.

The invention claimed is:

1. Process for converting waxy hydrocarbons to oils in the lubricating oil boiling range, said process comprising contacting said waxy hydrocarbons with a catalyst comprising an acidic partially decationized crystalline alumino-silicate zeolite in which at least 10% of the exchange capacity is satisfied by cations of a rare earth metal at a liquid hourly space velocity based on the fresh feed in the range of 0.1–10.0 (based on the crystalline zeolite content of the catalyst), and hydrogen pressure in the range of 400 to 6000 p.s.i., at a gas recycle rate in the range of 0 to 20,000 scf/bbl of fresh feed and at a temperature in the range of 350°F. to 675°F., said space velocity, pressure, temperature and recycle conditions being selected so as to attain conversion of at least about 6% of said waxy hydrocarbon to oils in the lubricating oil viscosity range and with no appreciable conversion of said waxy hydrocarbons to materials boiling below 600°F., and wherein said zeolite contains less than 0.1 wt. % halide ions and less than 25 percent of the exchange capacity of said zeolite is satisfied by alkali metal cations.

2. Process according to claim 1 wherein said conditions are selected so as to attain said conversion with no appreciable conversion of said waxy hydrocarbons to materials of lower carbon number.

3. Process according to claim 1 wherein said temperature is in the range of 550° to 650°F. and wherein less than 10 percent of the waxy hydrocarbon which is so contacted is converted to hydrocarbons boiling below 600°F.

4. Process according to claim 2 wherein said temperature is in the range of 500°–575°F.

5. Process according to claim 2 wherein said temperature is in the range of 520°–560°F.

6. Process according to claim 1 wherein said waxy hydrocarbons are contained in a distillate oil having a viscosity at 100°F. in the range of 35–10,000 SUS and wherein the concentration of wax in said distillate is less than 50 weight percent and wherein said contact temperature is no greater than 650°F.

7. Process according to claim 6 wherein said wax concentration is less than about 20 percent and wherein said temperature is no greater than 550°F. and wherein said contacting is at a liquid hourly space velocity in the range of 0.5 to 5.

8. Process according to claim 2 whereisaid wherein said hydrocarbons are contained in a feed material comprising from 50–100 percent wax, wherein said temperature is no greater than 550°F. and wherein less than 15 percent of the charge stock is converted, in a single pass through a reactor, to products boiling below 650°F.

9. Process according to claim 1 wherein said waxy hydrocarbons are contained in a raffinate oil obtained by solvent extraction of a distillate oil having a viscosity at 100°F. in the range of 35–10,000 SUS.

10. Process according to claim 1 wherein said alumino-silicate zeolite catalyst is combined with a hydrogenation catalyst, and wherein said catalyst combination includes at least one metal, oxide or sulfide of at least one metal selected from the group consisting of Ni, Co, Mo, W, Pt, Pd, Re and Ru.

11. Process according to claim 1 wherein said waxy hydrocarbons are contained in an oily feed stock which contains less than 50 weight percent of wax and wherein less than 75 scf of $C_1$—$C_5$ hydrocarbon gases are produced, in a single pass through a reactor, for each barrel of fresh feed stock.

12. Process according to claim 1 wherein less than 35 scf of $C_1$—$C_5$ hydrocarbon gases are produced, in a single pass through a reactor, for each barrel of fresh feed stock.

13. Process according to claim 1 wherein the framework of said zeolite has a ratio Al/Si in the range of 0.35–0.65 and wherein in the range of 10–60 percent of the exchange capacity of said zeolite is satisfied by protons.

14. Process according to claim 13 wherein at least 40 percent of the exchange capacity of said zeolite is satisfied by cations of cerium III.

15. Process according to claim 1 wherein at least 90 percent of the feed to said process boils above 600°F.

* * * * *

UNITED STATES PATENT OFFICE
CERTIFICATE OF CORRECTION

Patent No. 3,764,516    Dated October 9, 1973

Inventor(s) Ib Steinmetz and David S. Barmby

It is certified that error appears in the above-identified patent and that said Letters Patent are hereby corrected as shown below:

The Assignee given in patent is incorrect. The correct Assignee is:

Sun Oil Company of Pennsylvania

Signed and sealed this 23rd day of July 1974.

(SEAL)
Attest:

McCOY M. GIBSON, JR.          C. MARSHALL DANN
Attesting Officer              Commissioner of Patents